N. S. BOWDISH.
Camera Stands.

No. 141,256.

Patented July 29, 1873.

Witnesses
Chas. F. Smith
Geo. D. Walker

Inventor
Nelson S. Bowdish
Lemuel W. Serrell
atty.

UNITED STATES PATENT OFFICE.

NELSON S. BOWDISH, OF RICHFIELD SPRINGS, NEW YORK.

IMPROVEMENT IN CAMERA-STANDS.

Specification forming part of Letters Patent No. 141,256, dated July 29, 1873; application filed March 5, 1873.

*To all whom it may concern:*

Be it known that I, NELSON S. BOWDISH, of Richfield Springs, in the county of Otsego and State of New York, have invented an Improvement in Camera-Stands, of which the following is a specification:

Weights have been used to counterpoise photographic cameras and facilitate the raising and lowering of the same; but the sliding support is liable to bind and not move up and down vertically. Besides this, the adjustable camera-stands are heavy and inconvenient, and the weight of the camera itself upon the table is liable to disarrange and injure the elevating mechanism.

My invention is made for overcoming all these difficulties; and it consists in a camera-stand provided with three sliding supports for the table, a counterpoise weight or spring, and cords extending from a common point of attachment over three sheaves to the said sliding supports, so that the said sliding supports are obliged to move with uniformity when the stand is being raised or lowered, and hence the parts cannot become twisted or bound when the weight of the camera is not centrally over the stand.

Figure 1:
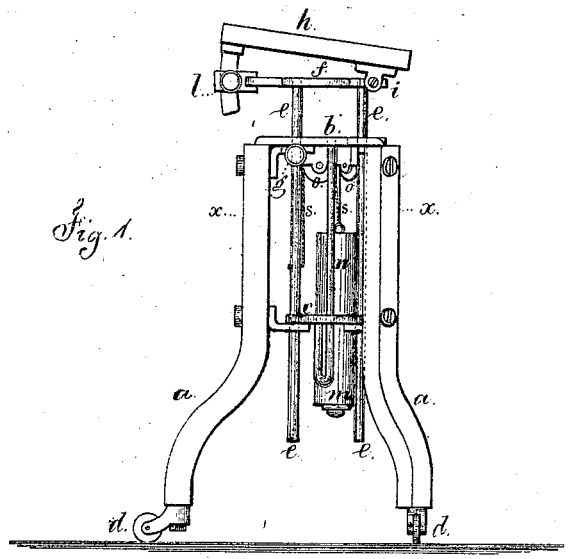
Figure 2:
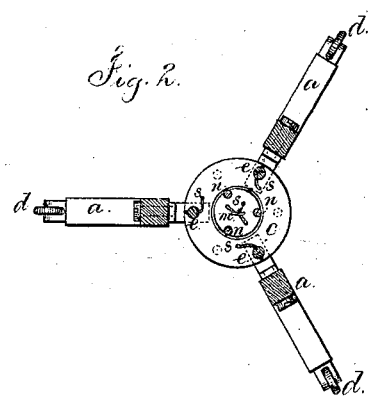
Figure 3:
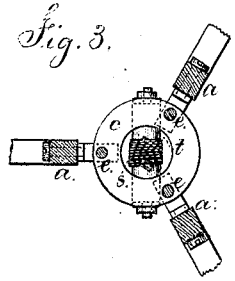

In the drawing, Figure 1 is an elevation of said stand. Fig. 2 is a sectional plan at the line $x$ $x$; and Fig. 3 is a sectional plan, representing a spring-barrel in place of a weight.

The three legs $a$ are united by the top plate $b$ and intermediate plate $c$, and should be provided with casters $d$. The sliding supports $e$ for the table or bed $f$ pass through holes in the plates $b$ and $c$; and at $g$ is a clamping-screw to secure the parts when the camera has been raised or lowered to the proper point. The stand or table $h$, upon which the camera is placed, is attached to $f$ by hinges $i$, and its inclination regulated by a segment and clamping-screw, $l$. The weight $m$ is guided within and between the rods $n$ that are attached at their upper ends to the plate $b$, and pass down through the central opening in the plate $c$, and are bent upwardly and outwardly and connected to said plate $c$. A tubular case, either closed or partially open, may take the place of these weight-guides $n$, if desired. The sheaves $o$ $o$ are placed radially between the sliding supports $e$ and the center of the plate $b$, so that three cords passed over these pulleys from the center of the weight and attached near the middle of the sliding supports $e$ shall move with uniformity as the stand is raised or lowered, and prevent the parts binding; and neither of the sliding supports $e$ can move up or down without the others also moving, in consequence of the connections through the cords $s$.

Wire cords may be employed, or chains; and the weight $m$ may be hollow, so as to allow for the introduction of more or less weight to balance the camera. A spring-barrel, $t$, may take the place of the weight $m$; and to this barrel either the three cords $s$ are passed, or they are connected together before reaching the barrel, said spring-barrel or a spring being the equivalent of the weight.

I claim as my invention—

The table or bed $f$ and supports $e$ attached together, and the latter sliding through the plates $b$ $c$, in combination with the counterpoise or spring and the separate cords or straps to each support $e$, passing over the separate pulleys and connected to such weight, the parts being combined and arranged to operate substantially as set forth.

Signed by me this 27th day of February, A. D. 1873.

N. S. BOWDISH.

Witnesses:
R. BUCHANAN,
PETER LUBY.